under 35 U.S.C. 154(b) by 2206 days.

(12) United States Patent
Bojinov et al.

(10) Patent No.: US 8,352,726 B2
(45) Date of Patent: Jan. 8, 2013

(54) DATA STORAGE AND/OR RETRIEVAL

(75) Inventors: Hristo Bojinov, Mountain View, CA (US); Serge Plotkin, Palo Alto, CA (US); Robert Wood, San Mateo, CA (US)

(73) Assignee: NetApp, Inc., Sunnyvale, CA (US)

( * ) Notice: Subject to any disclaimer, the term of this patent is extended or adjusted under 35 U.S.C. 154(b) by 2206 days.

(21) Appl. No.: 10/704,115

(22) Filed: Nov. 7, 2003

(65) Prior Publication Data

US 2005/0102498 A1 May 12, 2005

(51) Int. Cl.
*G06F 21/00* (2006.01)
(52) U.S. Cl. ........ 713/151; 713/152; 713/153; 713/167; 726/2; 726/26; 380/28
(58) Field of Classification Search .................. 713/151; 380/28
See application file for complete search history.

(56) References Cited

U.S. PATENT DOCUMENTS

| | | | |
|---|---|---|---|
| 4,588,991 A | 5/1986 | Atalla | |
| 5,065,429 A | 11/1991 | Lang | |
| 5,150,407 A | 9/1992 | Chan | |
| 5,204,903 A * | 4/1993 | Okada et al. .................... | 380/46 |
| 5,235,641 A | 8/1993 | Nozawa et al. | |
| 5,235,642 A | 8/1993 | Wobber et al. | |
| 5,422,699 A * | 6/1995 | Sato et al. ....................... | 396/82 |
| 5,442,699 A * | 8/1995 | Arnold et al. .................. | 713/188 |
| 5,592,556 A * | 1/1997 | Schwed ......................... | 380/274 |
| 5,623,548 A * | 4/1997 | Akiyama et al. ............... | 380/28 |
| 5,684,957 A * | 11/1997 | Kondo et al. ................... | 726/25 |
| 5,720,034 A | 2/1998 | Case | |
| 5,940,507 A | 8/1999 | Cane et al. | |
| 5,999,622 A * | 12/1999 | Yasukawa et al. .............. | 705/51 |
| 6,175,924 B1 | 1/2001 | Arnold | |
| 6,185,684 B1 | 2/2001 | Pravetz et al. | |
| 6,275,588 B1 * | 8/2001 | Videcrantz et al. ............ | 380/255 |
| 6,772,331 B1 * | 8/2004 | Hind et al. ...................... | 713/151 |
| 6,865,681 B2 * | 3/2005 | Nuutinen ......................... | 726/14 |
| 6,876,559 B1 * | 4/2005 | Rathnavelu et al. ........... | 365/49.1 |
| 6,985,995 B2 * | 1/2006 | Holland et al. ................. | 711/114 |
| 6,993,661 B1 | 1/2006 | Garfinkel | |
| 7,164,661 B2 * | 1/2007 | Kelly ............................. | 370/323 |
| 7,164,664 B2 * | 1/2007 | Duran et al. ................... | 370/329 |
| 2003/0050015 A1 * | 3/2003 | Kelly et al. .................... | 455/67.4 |

FOREIGN PATENT DOCUMENTS

WO  WO 02/093314 A2  11/2002

OTHER PUBLICATIONS

Reed, Benjamin C.; Smith, Mark A.; Diklic, Dejan. "Security Considerations When Designing a Distributed File System Using Object Storage Devices". First International Security in Storage Workshop. Pub. Date: Dec. 2002. Relevant pp. 24-34. Found on the World Wide Web at: http://ieeexplore.ieee.org/stamp/stamp.jsp?tp=&arnumber=1183507.*

* cited by examiner

*Primary Examiner* — Nathan Flynn
*Assistant Examiner* — Jeremiah Avery
(74) *Attorney, Agent, or Firm* — Cesari and McKenna, LLP

(57) ABSTRACT

A system and method comprises receiving a write request from a client to store data at first and second non-sequential locations of a storage medium. The data of the write request is recognized as not being a predefined data pattern, and a first encryption method is applied to the data of the write request before it is stored at the first and second non-sequential locations of the storage medium. Further, a second different encryption method is applied to content of an area between the first and second non-sequential locations, where the content of the area is recognized as being the predefined pattern.

37 Claims, 6 Drawing Sheets

DATA STORAGE AND/OR RETRIEVAL

BACKGROUND

This disclosure is related to data storage and/or retrieval.

One difficulty with state of the art technology, particular in networking, for example, is the ability for an unauthorized entity or individual to gain access to data that may be stored on and/or processed by one or more computing platforms. A need, therefore, exists for techniques and/or systems to make it more difficult for unauthorized intruders to gain access to such data.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

As previously indicated, one difficulty with state of the art technology, particular in networking, for example, is the ability for an unauthorized entity or individual to gain access to data that may be stored on and/or processed by one or more computing platforms. A need, therefore, exists for techniques and/or systems to make it more difficult for unauthorized intruders to gain access to such data.

Figure 1:
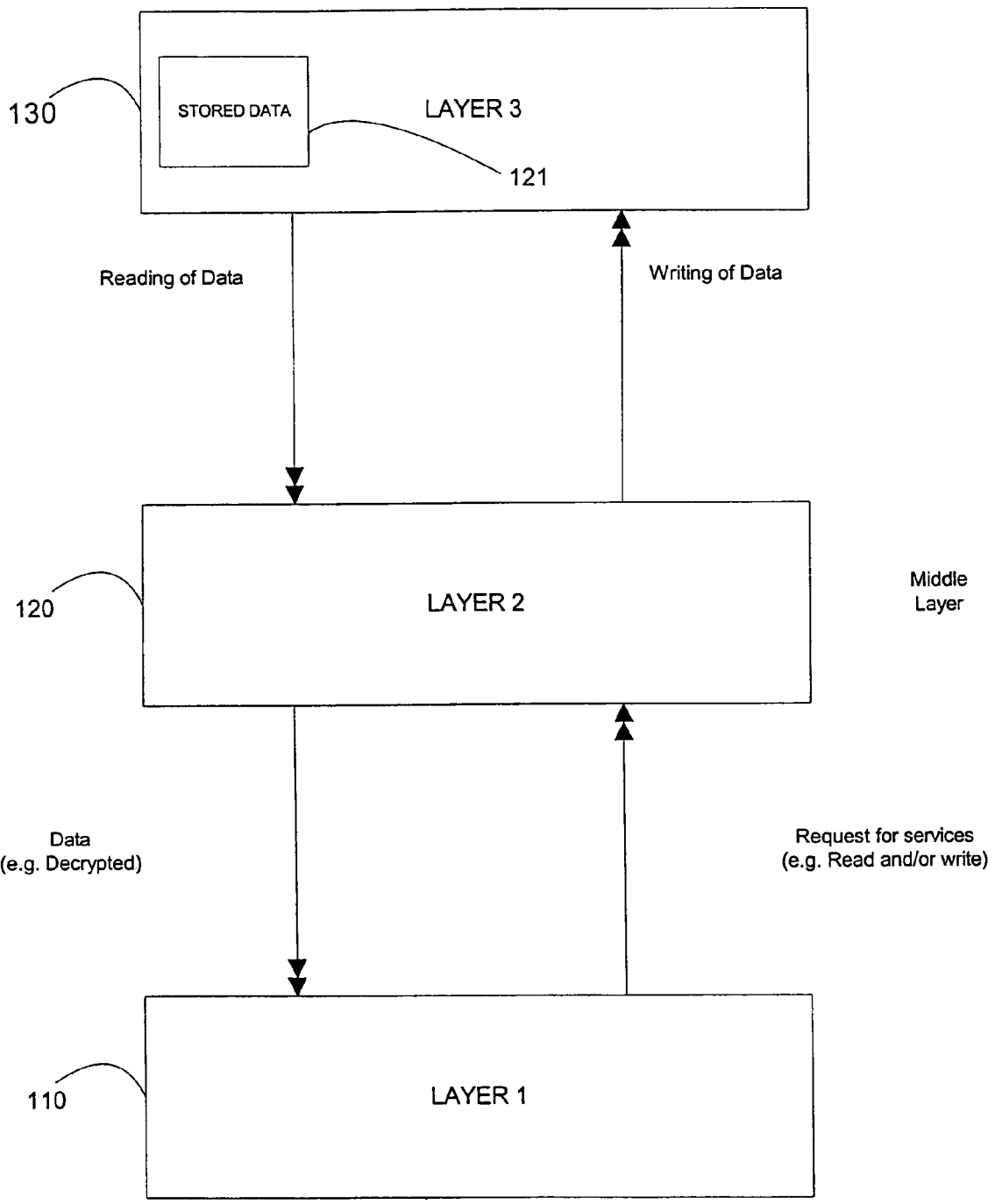
FIG. 1 is a schematic diagram illustrating an embodiment of a typical architecture in which data storage and/or retrieval may be implemented

FIG. 1 is a schematic diagram illustrating a typical architecture in which data storage and/or retrieval may be implemented, although the claimed subject matter is not limited in scope to this particular architecture. In this particular embodiment, FIG. 1 includes a first layer 110, a second layer 120 and a third layer 130. Thus, for this particular embodiment, first layer 110 may make a request for services, such as that data be written and/or read. Second layer 120 may receive the request and may then fulfill it, assuming, for example, that it is able to do so. There are a variety of services that may be provided by second layer 120. Frequently such services are data-related, such as authentication, authorization, and/or data storage and/or retrieval, although these are just examples.

In this particular approach, layer two (also referred to as second layer 120) supplements or enhances services that may be available from layer three (also referred to as third layer 130). Again, although the claimed subject matter is not limited in scope to this approach or architecture, it is, nonetheless, a common one. For example, web proxy servers employ this approach or architecture. One service that might also be provided by layer two includes security. For example, this may include firewall functionality, such as packet filtering, packet inspection (e.g., stateful and/or stateless), packet format validation, terminating IPSec connections, and the like. Another service that might be provided includes data encryption and/or decryption, as explained in more detail hereinafter. Without loss of generality, in this context, encryption refers to a process in which data is coded so that the content of the data is not capable of being employed or understood by a person or a device without first being decoded back to the previous form or format it had prior to being encrypted. Thus, decryption, in this context, refers to a process of decoding encrypted data back to the form or format it had prior to encryption.

Thus, in this particular example, if first layer 110 requests that data be written, second layer 120 may encrypt the data to be written. The data, once encrypted, is stored by or at a third layer, such as 130. This is illustrated in FIG. 1 by 121. Likewise, second layer 120 may, upon another request for services by first layer 110, such as a read request, retrieve the stored, encrypted data from layer three, decrypt it, and provide it to first layer 110. One potential advantage of an embodiment such as previously described is that encryption and/or decryption of the data may be made transparent to third layer 130, although it is not necessary that this be the case, even for this embodiment and, thus, the claimed subject matter is not limited in scope to embodiments where this is so. Likewise, although the claimed subject matter is not limited in scope in this respect, the encryption may be also made transparent to layer 1, e.g., the "consumer" of the services. Likewise, in another embodiment, layer 1 and layer 3 may reside on the same computing platform and even comprise the same layer in some embodiments, although the claimed subject matter is not limited in scope in this respect, of course.

Nonetheless, for such an embodiment, the encryption and/or decryption of data stored at or on third layer 130 does not impact the operation of layer 130. In this example embodiment, layer 130 treats the data the same regardless of whether or not the data is encrypted. This may provide some benefits, such as making interoperability with other systems straightforward. Of course, this is just one example of an embodiment of a data storage and/or retrieval technique and, as previously stated, the claim subject matter is not limited in scope to such an embodiment.

As previously described, one disadvantage of state of the art technology is the ability, potentially, for an unauthorized entity or individual to gain access to data stored on and/or being processed, such as may occur in networking, for example. In this context, networking is typically implemented using at least two computing platforms. A computing platform refers to a system or a device that includes the ability to process and store data in the form of signals. Thus, a computing platform, in this context, may comprise hardware, software, firmware and/or any combination thereof.

One approach or technique that may be employed to make unauthorized access to data more difficult is the previously described embodiment; however, one feature that may be useful in such an embodiment in connection with storage and/or retrieval of data is the ability to read and/or write data in any order, meaning, in this context, an order that is different than the sequential order in which the data may be stored. It worth noting, in this context, that storage may take any one of a variety of forms and the claimed subject matter is not limited in scope to any particular form of storing such data signals. Any and all methods and/or techniques for storing data signals now known or that may subsequently be developed are included within the scope of the claimed subject matter.

Typically, however, data is stored in a manner that may be physically and/or logically sequential. However, in some circumstances, it may be desirable to read and/or write data non-sequentially. As one example, it may be desirable to first write data to a storage location that would sequentially come later, such as writing to location or offset 100 before writing to location or offset 1, for example. Furthermore, legacy software may currently be operating in a variety of environments that assume this capability is present, thus, making it more desirable that the capability be available. In some contexts, this capability may be referred to as "random access."

In a system in which encryption is not necessarily employed, it is not unusual for data to be read and/or written out of order rather than sequentially. For example, storage devices exist that allow one to read data from a place where data is to be stored even if the data has not yet been written. For example, for a storage device that supports files, for example, one may create a file, write data into bytes 1-512, write more data into bytes 1024-2047 and then read bytes 513-1023. Usually, the result will be some pre-determined pattern, such as zeroes. However, reading bytes past 2047 in the example above will usually result in an error.

In the example above, the region 513-1023 is usually referred to as a "hole." It may be advantageous, in some embodiments, to implement a storage device, such as the one just described, in a way where little or no space is consumed by holes. In other words, if one creates a file and writes 1K bytes in the beginning and then writes 1K bytes at location 10G of the file, the file would not utilize 10G bytes of storage, although, of course, the claimed subject matter is not limited in scope in this respect.

A situation, as previously described, where data is read from storage locations before data has been written there, usually involves the use of a default pattern of some sort, as previously mentioned. All zeros was mentioned as one possibility, although the possibilities are endless and the claimed subject matter is not limited in scope to any particular default pattern. Without loss of generality, and not intending to limit the scope of the claims in any way, as an example, file systems that are based upon, are a variation of, and/or are an extension of the Unix operating system (hereinafter referred to as "a Unix-based operating system"), for example, typically implement data storage and/or retrieval in this manner. Thus, in such systems, if data is read from storage before data has been written there, the content retrieved, referred to in this context as "a hole," comprises all zeros. Thus, in this context, a hole in a data file refers to a range of locations in the data file that has not been written to or overwritten with data. In this context, this may also be referred to as a "hole in the data."

As is well-known, there are a variety of file types and/or structures currently in use for storing data. As just one example, the Network File System (NFS) explicitly indicates that servers compatible and/or compliant with the NFS protocol should provide support for a hole-type feature. Most clients that employ a Unix-based operating system use NFS for remote file access. Sun® Microsystems introduced NFS in 1985. Since then, it has become a de facto standard protocol, used by over ten million systems worldwide. NFS is particularly common on Unix-based systems, but NFS implementations are available for virtually every modern computing platform in current use, from desktops to supercomputers. A hole may occur, for example, if, after creating a file, a client program writes to that file beginning at X, sometimes referred to as an offset in the file, where X is a positive integer here. The resulting data file in this example will then include a hole from location zero to location X-1.

Although the NFS file system and Unix-based operating systems are specifically mentioned above, this issue may arise for systems other than those that employ Unix or NFS. Essentially, any time data is read from storage and data has not yet been written there, this issue may arise. Thus, the scope of the claimed subject matter is not limited to a particular hardware platform, software platform, file type, data type, file structure, data structure, operating system, application, or the like. Furthermore, the claimed subject matter is not limited to a particular implementation of holes in data files. For example, the subject matter is not limited to an implementation where a hole comprises content of all zeros, although that example has been used several times during the foregoing discussion.

Referring, again, to the embodiment of FIG. 1, a difficulty may arise in a system where it is desired that encryption and/or decryption be transparent to a third layer, and also desired that reading and/or writing be possible in any order, e.g., out of order, although, again, this is just an example embodiment. For example, one possible embodiment is to implement a second layer that encrypts all data that is written through it and decrypts all data being read through it. If one reads data from a "hole," the second layer will treat it like all other data and decrypt it. Unfortunately, this approach will not accomplish transparency as fully as may be desired in some circumstances, since software packages may rely on the assumption that a predefined pattern, usually zeroes, will be present when reading data from a "hole." One possible solution to the above issue is to make sure that there are no holes created in the third layer by filling the holes with an encrypted pattern, such as encrypted zeroes. This approach, although preserving transparency from the point of view of the first layer, is not as efficient as might be desired in some circumstances since filling holes is time consuming and utilizes storage space.

Another approach to address this difficulty is to have the ability to distinguish between data that is encrypted and data that is read from storage positions to which data has not yet been written. This may be accomplished in a variety of ways. In one such approach, for example, the content of storage to which data has not yet been written may contain a non-encrypted default pattern that is capable of being recognized by a middle layer, such as a second layer in this particular embodiment. In such an embodiment, if, for example, a request to write data is communicated from layer one (also referred to as a first layer) to layer two, after encrypting the data to be written, layer two may verify that the resulting encrypted data to be stored on or at layer three does not match the non-encrypted default pattern that is employed as the content for storage positions to which data has not yet been written. Where a match occurs, another encryption method may be applied or other special processing may be applied, depending upon the particular embodiment, such as, for example, storage elsewhere, although this is simply an example. Likewise, in such an embodiment, if, for example, a request to read data is communicated from layer one to layer two, after reading the data and prior to decryption, layer two may determine whether or not the data contains the non-encrypted default pattern. If so, then the second layer may apply another decryption method than the method being applied to the other data, depending upon the particular embodiment. For example, in a particular embodiment, this may include passing the data read from layer three to layer one without performing decryption. This latter approach may be desirable in some situations in that decryption may consume processing resources and the presence of the non-encrypted default pattern would indicate that the locations are locations to which data has not yet been written. Of course, as previously explained, such an approach will not be "completely" transparent.

While in the previously described embodiment, encryption and/or decryption was assumed transparent to layer three, as previously indicated, this need not be the case in an alternative embodiment. For example, communications may take place between the layers to provide relevant and/or useful encryption and/or decryption information to layer three. Thus, information and/or data may be passed that may reduce the processing load for layer two, for example. Likewise, in another alternative implementation, layer 3 may specify, upon a read request, for example, whether the data being returned is a hole or not. Of course, such an approach is less transparent than some of the previously described embodiments.

Although the foregoing embodiments did not focus on implementing holes, embodiments of a technique for data storage and/or retrieval within the scope of the claimed subject matter may include the capability to provide for holes in data to be stored, the holes in the data corresponding to places in data storage to which data has not yet been written. Likewise, embodiments may include the capability to fill holes in data that had been stored previously. In this context, filling a hole refers to writing data to fill where the hole had been located in the data file so that the resulting file no longer has a hole there. Again, in this context, this may also be referred to as "filling a hole in data." Thus, embodiments in accordance with the claimed subject matter includes the capability to "recognize holes" by recognizing a special or default pattern, and includes the capability to provide special treatment for the holes, such as during writing, e.g., creation of holes, and/or during reading. The following discussion details several possible embodiments for accomplishing this, although these are merely examples and are not intended to limit the scope of the claimed subject matter.

In one particular embodiment, although the claimed subject matter is not limited in scope in this respect, providing a hole in data to be stored or providing for a hole may include inserting a default pattern into actual data prior to its storage. This particular embodiment, it may be noted, is independent of the system architecture. Thus, it is not necessary that three layers be employed and it is not necessary that encryption and/or decryption be transparent to a particular layer; of course, embodiments that include such features are also within the scope of the claimed subject matter, as previously described. Likewise, it is not necessary that the default pattern have a particular form. For example, such a default pattern may comprise a random or pseudo-random pattern. Alternatively, a default pattern may comprise a fixed pattern. One example of a fixed pattern, as previously described, includes an all zero pattern, although, again, the claimed subject matter is not limited in scope to an all zero default pattern.

Figure 2:
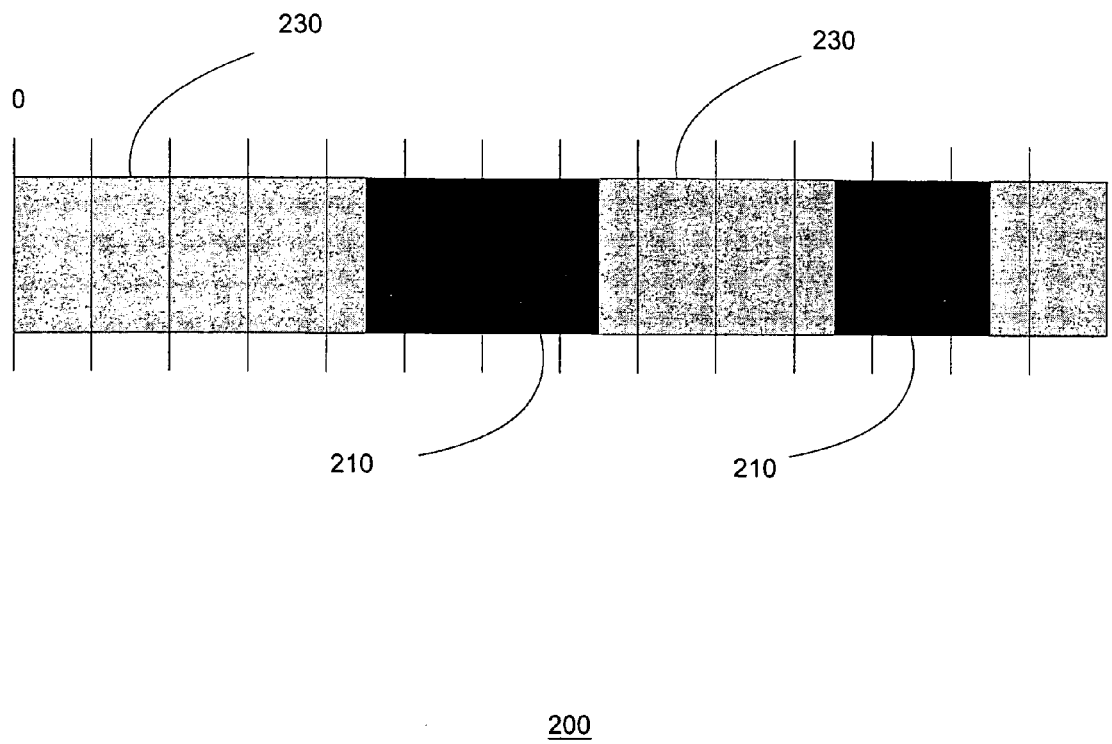
FIG. 2 is a schematic diagram illustrating an embodiment of a technique for storing and/or retrieving data.

For this particular embodiment, however, assuming an all zero default pattern, the data, including the hole or holes in the data corresponding to memory locations to which data has not yet been written, may be encrypted prior to storage. In this particular embodiment, the default pattern or patterns are inserted in the data to provide for one or more holes. Thus, inserted default pattern or patterns correspond to positions and lengths of contiguous positions or places in the file to which data has not yet been written. This is illustrated in FIG. 2. Embodiment 200 illustrates a contiguous set of data; however, portions 210 indicate actual data, whereas portions 230 indicate holes. In this embodiment, the entire contiguous set of data is encrypted, as just described; however, this is just one particular embodiment and the scope of the claims is not limited to this or any other particular implementation or embodiment.

In another embodiment, the actual data to be stored may be padded with a default pattern, again, as one example, zeros, so that the padded data, here, actual data plus default pattern or patterns, corresponds to a multiple of an encryption block size. In this context, an encryption block size refers to a block of contiguous data of a particular length. Thus, blocks of data of the encryption block size length are either encrypted or not encrypted, in whole. Again, for this embodiment, blocks are written and/or read in multiples of an encryption block size and, thus, a block of contiguous data of at least the encryption block size length is either entirely encrypted or entirely not encrypted. For this embodiment, then, padded data may be encrypted prior to being stored. Thus, when data is read and/or written, in this particular embodiment, it is also read and/or written in multiples of an encryption block size. Here, for example, an encryption block size may comprise a multiple of two, such as 512 or 16 bytes, although the claimed subject matter is not limited to these example block sizes. An encryption block size may be of any length and still be within the scope of the claimed subject matter. For this particular embodiment, then, if data is read that constitutes non-encrypted data containing a recognizable default pattern, such as all zeros, in one particular example, such content indicates storage positions to which data has not yet been written.

Figure 4:
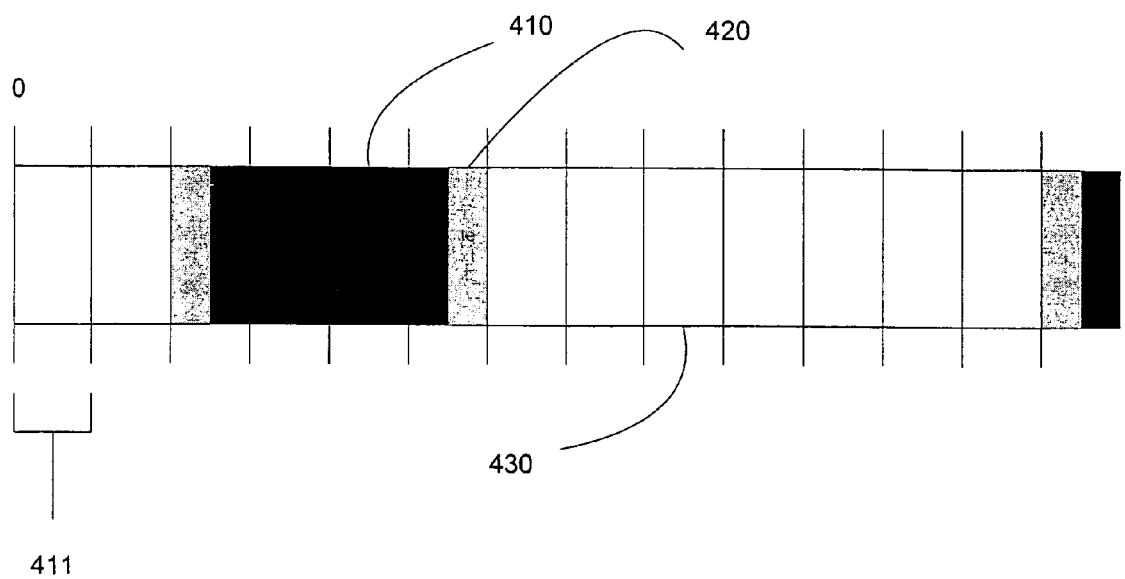
FIG. 4 is a schematic diagram illustrating yet another embodiment of a technique for storing and/or retrieving data.

While for this particular embodiment, as just explained, storage to which data has not yet been written are indicated by a recognizable default pattern in decrypted data; likewise, such patterns may also show up after decryption, such as where the particular block of data also contains actual data, but has been padded to comprise a multiple of an encryption block size, as just described. This particular embodiment is illustrated in FIG. 4. In embodiment 400, reference numeral 410 indicates actual data and reference 411 indicates an encryption block size. Reference numeral 430 indicates a portion of a hole provided for using a non-encrypted default pattern, whereas reference number 420 indicates a portion of a hole provided for using an encrypted default pattern.

Figure 3:
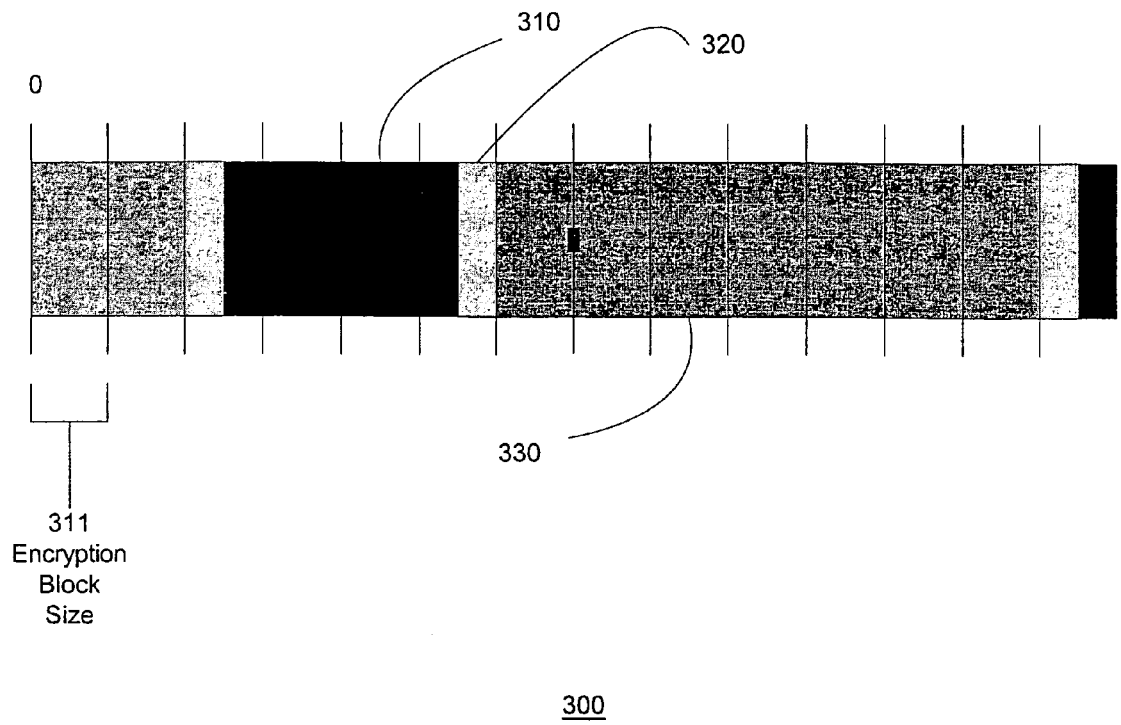
FIG. 3 is a schematic diagram illustrating another embodiment of a technique for storing and/or retrieving data.

Of course, yet another embodiment may include providing for any holes in a file using encrypted data. Thus, such holes are recognized after decryption produces a recognizable default pattern, such as, again, as an example, contiguous zeros. However, data may still be read and/or written in multiples of the encryption block size. This particular embodiment is illustrated in FIG. 3. In embodiment 300, reference numeral 310 indicates actual data and reference 311 indicates an encryption block size. Reference numeral 330 indicates a portion of a hole provided for using an encrypted default pattern, and reference number 320 also indicates a portion of hole provided for using an encrypted default pattern. Nonetheless, again, the claimed subject matter is not limited in scope to the foregoing embodiments; these are merely provided as examples within the scope of the subject matter claimed. Many other embodiments are possible and are included within the scope of the appended claims.

Figure 5:
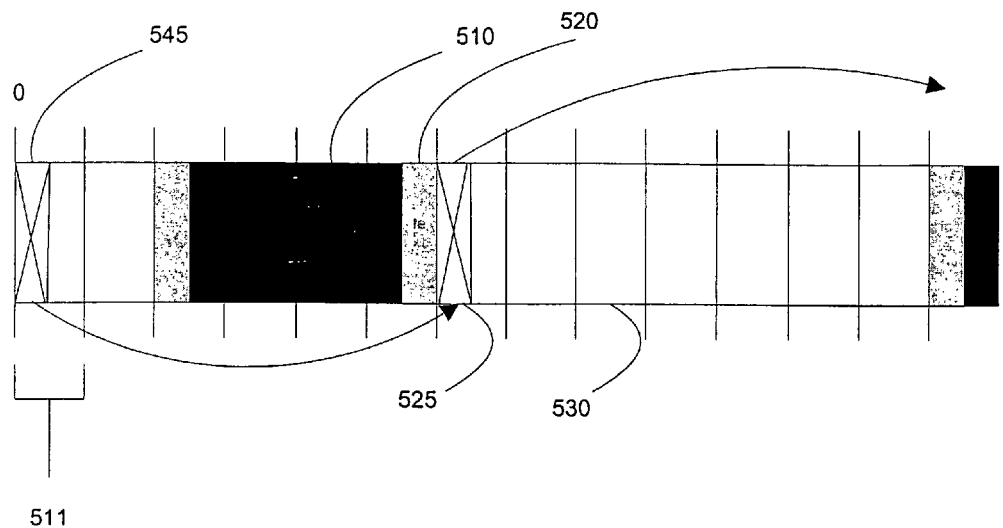
FIG. 5 is a schematic diagram illustrating one more embodiment of a technique for storing and/or retrieving data.

As yet another example, embodiment 500 of FIG. 5 may be employed with, in addition, "hole data" provided in selected locations, this additional data providing information about one or more holes contained in the particular file. In this figure, 510, 511, 520 and 530 are similar to the corresponding subject matter of FIG. 4, that is, 410, 411, 420, and 430. However, in this embodiment, additional data, such as 545 and 525, for example, may point to the next hole in the file. In the embodiment of FIG. 5, the additional data may be inserted where a default pattern, such as, for example, zeros, would otherwise have been, except for a file header to point to the first hole, as further illustrated in FIG. 5. However, this is merely another example of how this might be implemented, and the claimed subject matter is not limited in scope to this particular embodiment. Alternately, other additional and/or different data may be inserted in other additional and/or different locations and still remain within the scope of the appended claims. For example, an entirely separate file may provide information regarding the location and size of one or more holes throughout a given file, although, again, this is intended merely as another example within the scope of the claimed subject matter, but is not intended to limit that scope in any way.

It will now be appreciated that filling holes for several of the foregoing embodiments may comprise simply writing actual data to the portions of the data corresponding to a default pattern. However, the data to be written should typically be encrypted. Likewise, for embodiments employing an encryption block size, the encrypted data written to fill the hole or holes is written in multiples of an encryption block size. However, for the embodiment of FIG. 5, filling holes may be more involved. Typically, it should involve modifying the data providing information about the holes. Thus, this potentially added complexity is one possible disadvantage of this approach.

Embodiments of the claimed subject matter are well suited to a variety of networking applications and/or systems, such as computer network systems, employing a variety of different topologies, including, for example, storage area networking (SAN), although, of course, the claimed subject matter is not limited in scope in this respect. In such an embodiment, although the claimed subject matter is not limited in scope in this respect, a configuration may be employed in which management is accomplished of small, medium, or large networks comprised of storage devices, computers, other computing platforms, and/or the like, that are communicatively coupled to dissimilar storage devices, computers, other computing platforms, and/or the like.

Figure 6:
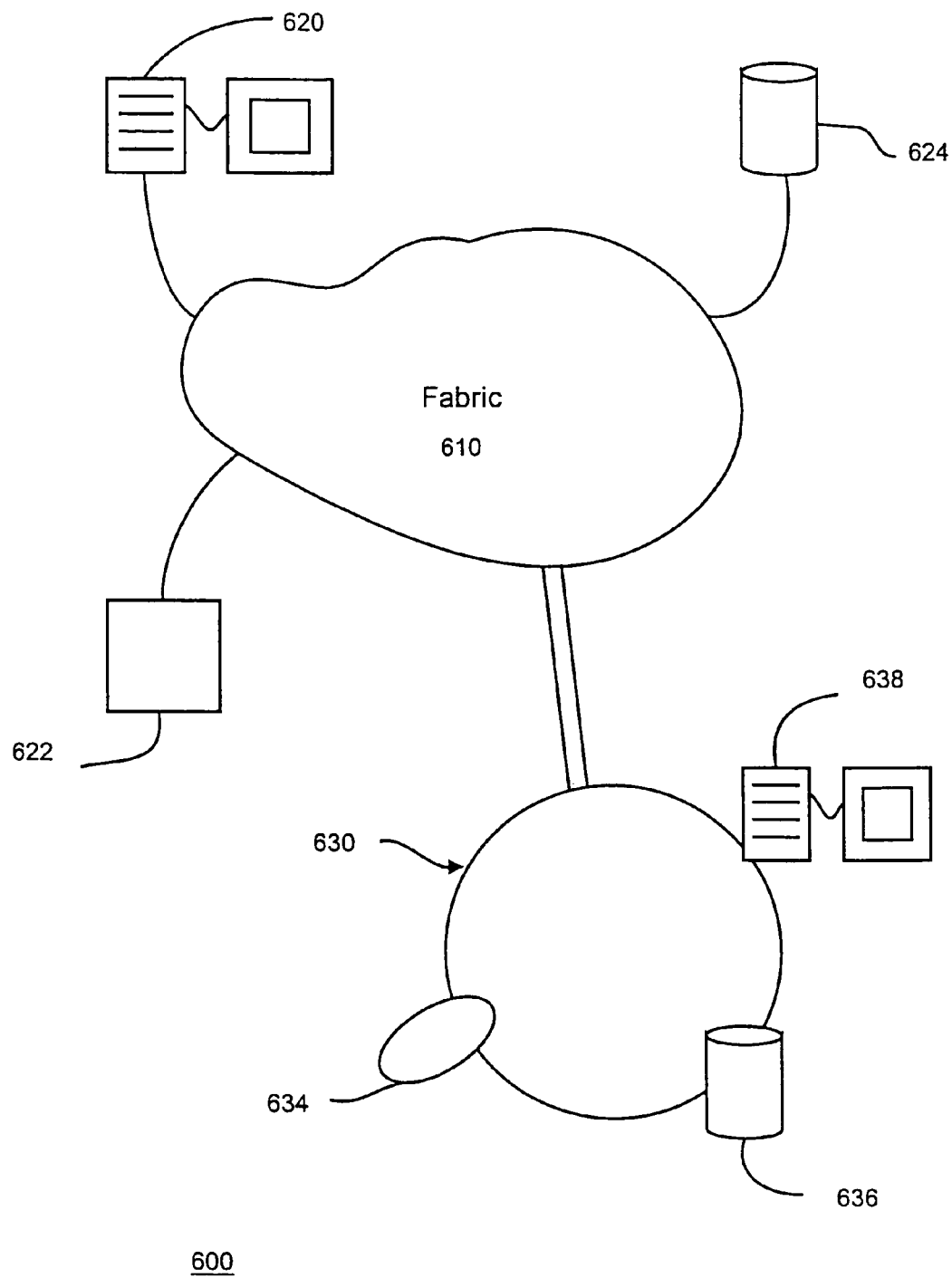
FIG. 6 is a schematic diagram illustrating an embodiment of a network.

FIG. 6 is a schematic diagram of a example embodiment of a communications network system 600 that may employ an embodiment in accordance with the claimed subject matter. In this example, embodiment 600 comprises a switched fabric 610 and a plurality of devices, such as 620, 622, 624, and/or groups of devices, such as 634, 636, and 638, as indicated with respect to logical loop 130, for example. References to "a switch" or to "switches" are intended to refer to a generic switch. In this context, then, the term switch refers to a device that includes a processor and memory and that is adapted to or has the capability to route frames or packets between two or more separate devices. In general, a switched fabric, such as fabric 610, may be communicatively coupled to various devices, such as, here, 620, 622, and 624, and may operate as a switching network to allow these devices to communicate with each other. Devices 620, 622, and 624 may comprise any type of device, such as, for example, a computing platform, a storage device, and/or the like, and may be communicatively coupled via fabric 610 by employing point-to-point communications technology or techniques, as one example. In this particular embodiment, fabric 610 comprises a variety of communicatively coupled switches. In this particular embodiment fabric 610 is also in communication with logical loop 630. Loop 630 here includes devices 634, 636 and 638. In this particular embodiment, loop 630 comprises an arbitrated loop with ring couplings for providing multiple nodes with the ability to arbitrate access to shared bandwidth. It is, of course, appreciated that this particular embodiment is merely an illustrative example and the claimed subject matter is not limited in scope in any way to this particular embodiment.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and configurations were set forth to provide a thorough understanding of the claimed subject matter. However, it should be apparent to one skilled in the art having the benefit of this disclosure that the claimed subject matter may be practiced without the specific details. In other instances, well-known features were omitted or simplified so as not to obscure the claimed subject matter. While certain features have been illustrated and described herein, many modifications, substitutions, changes and equivalents will now occur to those skilled in the art. It is, therefore, to be understood that the appended claims are intended to cover all such modifications and changes as fall within the true spirit of the claimed subject matter.

The invention claimed is:

1. A method, comprising:

receiving a write request from a client
to store data of the write request at first and second locations that are non-sequential on a storage medium, wherein an area between the first and the second locations corresponds to content of the storage medium that has not been written to or overwritten;
recognizing that the data of the write request is not a predefined data pattern of one or more predefined data patterns;
applying a first encryption method to the data of the write request prior to storing the data at the first and the second locations that are non-sequential on the storage medium;
recognizing the content of the area between the first and the second locations as the predefined data pattern of the one or more predefined data patterns; and applying a second encryption method associated with the predefined data pattern to the content of the area between the first and the second locations, wherein the second encryption method is different than the first encryption method.

2. The method of claim 1, wherein at least one of the first and the second encryption methods is transparent to the client.

3. The method of claim 1, further comprising inserting a default pattern when applying the second encryption method to the content of the area between the first and the second locations.

4. The method of claim 1, further comprising reading the data of the storage medium non-sequentially.

5. The method of claim 1, wherein the data is stored in a multiple of a data encryption block size.

6. The method of claim 1, further comprising inserting at least one predefined data pattern of the one or more predefined data patterns into the storage medium prior to storing the data of the write request to the storage medium.

7. The method of claim 6, wherein the at least one predefined data patterns is a random pattern.

8. The method of claim 1, wherein the area between the first and the second locations is a hole.

9. The method of claim 1, further comprising:
receiving a read request from the client for the data and the content of the area;
applying a first decryption method to the data encrypted with the first encryption method and stored at the first and the second locations that are non-sequential; and
applying a second decryption method to the content of the area encrypted with the second encryption Method.

10. The method of claim 9, wherein the second decryption method comprises providing the content without performing decryption on the content, wherein the second encryption method inserts a default pattern.

11. The method of claim 1, wherein the predefined data pattern of the one or more predefined data patterns comprises a fixed pattern.

12. The method of claim 11, wherein the fixed pattern comprises zeros.

13. The method of claim 8, wherein recognizing the predefined data patterns comprises recognizing the hole.

14. The method of claim 8, further comprising providing hole data in the storage medium, wherein the hole data provides additional data about one or more holes contained in a file stored on the storage medium.

15. The method of claim 14, wherein the additional data comprises pointers to a next hole in the file.

16. The method of claim 1, wherein the storage medium comprises one or more disks.

17. The method of claim 1, wherein the storage medium comprises one or more CD-ROMs.

18. The method of claim 1, wherein the storage medium comprises static random access memory.

19. The method of claim 1, wherein the storage medium comprises dynamic random access memory.

20. The method of claim 1, wherein the storage medium comprises flash memory.

21. A non-transitory computer-readable medium containing executable program instructions executed by a processor, comprising:
program instructions that receive a write request from a client to store data of the write request at first and second location that are non-sequential on a storage media, wherein an area between the first and the second locations corresponds to content of the storage media that has not been written to or overwritten;
program instructions that recognize that the data of the write request is not a predefined data pattern of one or more predefined data patterns;
program instructions that apply a first encryption method to the data of the write request prior to storing the data at the first and the second locations that are non-sequential on the storage media;
program instructions that recognize the content of the area between the first and the second locations as the predefined data pattern of the one or more predefined data patterns; and
program instructions that apply a second encryption method associated with the predefined data pattern to the content of the area between the first and the second locations, wherein the second encryption method is different than the first encryption method.

22. The non-transitory computer-readable storage medium of claim 21, wherein the content of the area between the first and the second locations is a hole.

23. The non-transitory computer-readable storage medium of claim 21, wherein the data is stored in a multiple of a data encryption block size.

24. The non-transitory computer-readable storage medium of claim 21, further comprising program instructions that insert at least a default pattern when applying the second encryption method to the content of the area between the first and the second locations.

25. A system, comprising:
a computer system configured to receiving a write request from a client to write data of the write request at first and second locations that are non-sequential on a storage medium, wherein an area between the first and the second locations corresponds to content of the storage medium that has not been written to or overwritten;
a processor of the computer system configured to recognize that the data of the write request is not a predefined data pattern of one or more predefined data patterns, the processor further configured to apply a first encryption method to the data of the write request prior to storing the data at the first and the second locations that are non-sequential on the storage medium, the processor further configured to recognize the content of the area between the first and the second locations as the predefined data pattern of the one or more predefined data patterns, and the processor further configured to apply a second encryption method associated with the predefined data pattern to the content of the area between the first and the second locations, wherein the second encryption method is different than the first encryption method.

26. The system of claim 25, wherein at least one of the first and the second encryption methods is transparent to the client.

27. The system of claim 25, wherein the content of the area between the first and second the locations is a hole.

28. The system of claim 25, wherein the data is stored in a multiple of a data encryption block size.

29. The system of claim 25, wherein the processor is further configured to insert at least one predefined data pattern of the one or more predefined patterns into the storage medium prior to storing the data of the write request to the storage medium.

30. The system of claim 25, wherein the processor is further configured to insert a default pattern when the second encryption method is applied to the content of the area between the first and the second locations.

31. The system of claim 25, wherein the processor is further configured to provide the content to the client without performing decryption on the content in response to a read request, wherein the second encryption method inserts a default pattern.

32. The system of claim 25, wherein the storage medium comprises one or more disks.

33. The system of claim 25, wherein the storage medium comprises one or more CD-ROMs.

34. The system of claim 25, wherein the storage medium comprises random access memory.

35. The system of claim 25, wherein the storage medium comprises flash memory.

36. The system of claim 25, wherein the processor is further configured to read the data of the storage medium non-sequentially.

37. The system of claims 30, wherein the predefined data patterns of the one or more predefined data patterns comprises a random pattern.

* * * * *

UNITED STATES PATENT AND TRADEMARK OFFICE
CERTIFICATE OF CORRECTION

PATENT NO. : 8,352,726 B2
APPLICATION NO. : 10/704115
DATED : January 8, 2013
INVENTOR(S) : Bojinov et al.

It is certified that error appears in the above-identified patent and that said Letters Patent is hereby corrected as shown below:

In the Claims:

In col. 9, line 66 should read:
Locations that are non-sequential on a storage media, In col. 10, line 63 should read:
The one or more predefined data patterns into the storage medium Signed and Sealed this
Fourth Day of June, 2013

Teresa Stanek Rea
*Acting Director of the United States Patent and Trademark Office*